(12) United States Patent
Faibish et al.

(10) Patent No.: US 9,081,771 B1
(45) Date of Patent: Jul. 14, 2015

(54) ENCRYPTING IN DEDUPLICATION SYSTEMS

(75) Inventors: Sorin Faibish, Newton, MA (US);
Philippe Armangau, Acton, MA (US);
Christopher Seibel, Walpole, MA (US)

(73) Assignee: EMC Corporation, Hopkinton, MA (US)

( * ) Notice: Subject to any disclaimer, the term of this patent is extended or adjusted under 35 U.S.C. 154(b) by 247 days.

(21) Appl. No.: 12/975,716

(22) Filed: Dec. 22, 2010

(51) Int. Cl.
*G06F 7/04* (2006.01)
*G06F 17/30* (2006.01)
*G06F 11/14* (2006.01)

(52) U.S. Cl.
CPC ............ *G06F 17/30* (2013.01); *G06F 11/1448* (2013.01)

(58) Field of Classification Search
CPC ............ G06F 17/3015; G06F 11/1453; G06F 11/1448

USPC ................................. 380/44; 713/165; 726/6
See application file for complete search history.

(56) References Cited

U.S. PATENT DOCUMENTS

| | | | |
|---|---|---|---|
| 2002/0107877 A1* | 8/2002 | Whiting et al. ............... | 707/204 |
| 2004/0143743 A1* | 7/2004 | Margolus et al. ............. | 713/176 |
| 2009/0319772 A1* | 12/2009 | Singh et al. ................... | 713/153 |
| 2010/0083003 A1* | 4/2010 | Spackman .................... | 713/193 |

* cited by examiner

*Primary Examiner* — Ellen Tran
(74) *Attorney, Agent, or Firm* — Deepika Bhayana; Jason A. Reyes; Krishnendu Gupta

(57) ABSTRACT

A method is used in encrypting in deduplication systems. A deduplicating technique is applied to a data object. Applying the deduplicating technique includes computing a digest of the data object. An encryption key is derived from the digest of the data object. The data object is encrypted using the encryption key.

17 Claims, 14 Drawing Sheets

INDEX TABLE

| | GENERATION COUNT (110) | DIGEST (21) | DEDUPLICATION KEY (27) | |
|---|---|---|---|---|
| INDEX 0 | 0 | DIGEST - DB 0 | KEY - DB 0 | 116 |
| INDEX 1 | 0 | DIGEST - DB 1 | KEY - DB 1 | 118 |
| INDEX 2 | 1 | DIGEST DB 1 (DB 4) | KEY - DB 4 | 120 |
| INDEX 3 | 0 | DIGEST - DB 2 | KEY - DB 2 | 122 |
| ... | ... | ... | ... | |
| INDEX 100 | 1 | DIGEST - DB 100 | KEY - DB 100 | 124 |

FIG. 7

ENCRYPTING IN DEDUPLICATION SYSTEMS

BACKGROUND

1. Technical Field

This application relates to encrypting in deduplication systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

Further, data is a vital business asset for any organization. Therefore, in today's highly inter-connected and mobile environment, the ability to collaborate securely is a must. Businesses need to protect and securely share information with shareholders, employees, partners and customers. Additionally, as more data is stored on the data storage systems, storage administrators must manage this escalating capacity of data while protecting important data against loss or theft. Deduplication and encryption are technologies that help manage this escalating capacity of data securely.

Deduplication is a space-saving technology intended to eliminate redundant (duplicate) data (such as, files) on a data storage system. By saving only one instance of a file, disk space can be significantly reduced. For example, if a file of size 10 megabytes (MB) is stored in ten folders of each employee in an organization that has ten employees. Thus, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file.

However, the proliferation of data loss coupled with new governance and compliance regulations is driving the need for customers to encrypt their data as well. Encryption is a technology that is used to protect data, prevent unauthorized users from accessing information even if data is compromised or stolen. Encryption uses a mathematical algorithm with a unique key to encode data into a form that cannot be read. No one else can access or use the encrypted data until it is unencrypted again using either the identical key or a different decryption key. If the encryption/decryption key is lost or forgotten, any data encrypted with that key will be rendered inaccessible.

While deduplication systems have helped make data management much easier, they also come with a number of challenges. Deduplicating systems can only encrypt data that is at rest, which means that data has already been archived or copied to backup systems. Encrypting data at rest satisfies some aspects of internal governance rules and compliance regulations but exposes data to a risk of loss and theft until the time at which deduplicated data is encrypted. Encrypting data at rest also introduces the overhead of managing encryption/decryption keys in a data storage system.

SUMMARY OF THE INVENTION

A method is used in encrypting in deduplication systems. A deduplicating technique is applied to a data object. Applying the deduplicating technique includes computing a digest of the data object. An encryption key is derived from the digest of the data object. The data object is encrypted using the encryption key.

BRIEF DESCRIPTION OF THE DRAWINGS

Features and advantages of the present invention will become more apparent from the following detailed descrip

FIGS. 5-8 are diagrams illustrating in more detail components that may be used in connection with techniques herein;

DETAILED DESCRIPTION OF EMBODIMENT(S)

Figure 1:
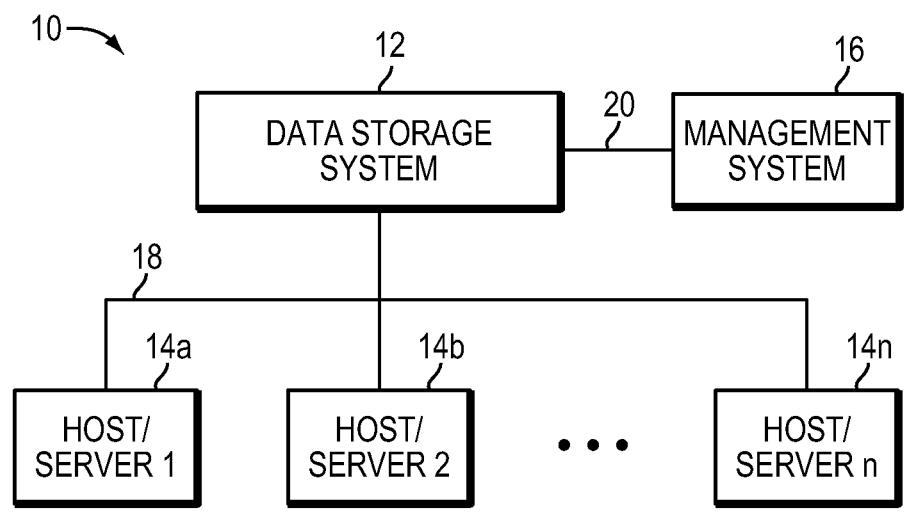
- FIG. 1 is an example of an embodiment of a computer system that may utilize the techniques described herein.

Described below is a technique for use in encrypting in deduplication systems (i.e., data deduplication systems), which technique may be used to provide, among other things, applying a deduplicating technique to a data object by computing an index (such as a digest) of the data object and encrypting the data object by using the index of the data object as an encryption key.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. A storage extent is a contiguous area of storage reserved for a user requesting the storage space. In such systems, an index table of unique digests is created to find commonality among the data set. However, conventionally, it is difficult or impossible for data deduplication systems to encrypt data blocks while processing data blocks for deduplication. A goal is to encrypt data blocks while data blocks are being processed for deduplication.

In at least one storage system implementation as described below, encrypting in deduplication systems includes computing a digest of a data object, deriving an encryption key from the digest of the data object, and encrypting the data object using such encryption key.

Conventionally, data deduplication for feature software requires that data blocks in a storage extent be iterated from beginning to end. A set of storage extents that are deduplicated together form a deduplication domain. As a result, in a conventional system, every data block of each storage extent in the deduplication domain is iterated through according to a specific iteration scheme. During this process, an index table of unique digests is created from the blocks that are iterated through. In a conventional system, data blocks in the storage extent are encrypted after data blocks are indexed, deduplicated, and are written to a disk. In such a conventional system, an encryption technique may use any one of number of the well-known and publicly available public key encryption algorithms to encrypt the data. As a result, in such a conventional system, the storage system must maintain a set of encryption and decryption keys by using a key management scheme such that data blocks can be encrypted and decrypted later. Further, in such a conventional case, deduplication systems cannot access encrypted deduplicated data without introducing complexity involved in managing encryption and decryption keys that are additional to and separate from information used to deduplicate data.

By contrast, in at least some implementations in accordance with the technique as described herein, the use of the encrypting in deduplication systems technique can provide one or more of the following advantages: lowering costs by improving deduplication and encryption efficiency, minimizing overhead for encryption processing by using the same index for encryption of data blocks that is used in deduplication processing of data blocks, reducing number of computations required for encryption processing by encrypting only deduplicated data that stores only a single copy of each unique set of data and simplifying encryption processing by using an index of a data block as an encryption key, thus removing or reducing a need for maintaining a separate set of encryption/decryption keys for encryption processing. Additionally, in accordance with the current technique, an index (such as a digest) of a data block can be computed and recovered at any time, which, as a result, eliminates or reduces a need for maintaining a separate database of encryption and decryption keys.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

Figure 2:
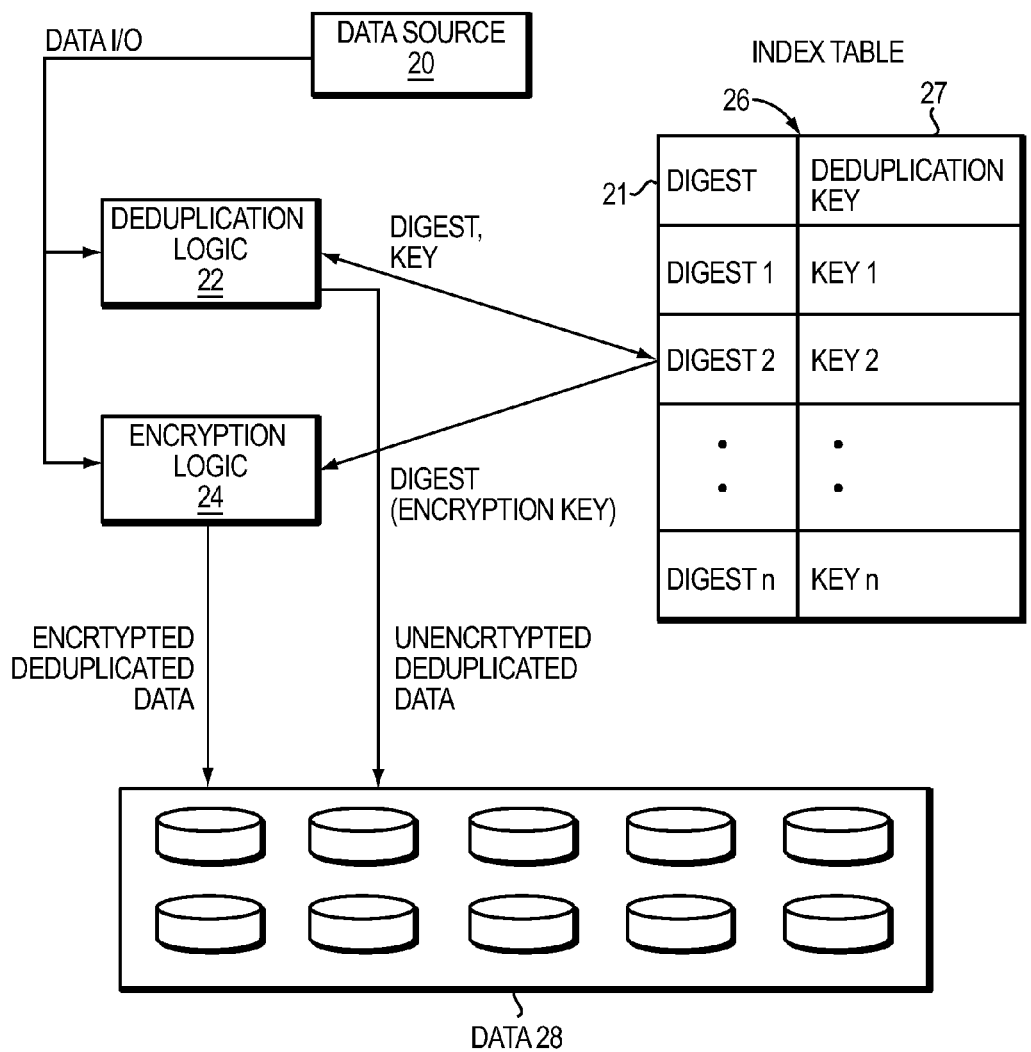
FIG. 2 is diagram illustrating in more detail components that may be used in connection with techniques herein.

Referring to FIG. 2, shown is a more detailed representation of components that may be included in an embodiment using the techniques herein. The system described herein may provide encryption in deduplication systems for data stored on any type of storage medium or device, including disk storage. In at least one embodiment of the current technique, data source 20 can be, for example, a server, a personal computer, a client workstation, or any other device capable of initiating data I/O requests (e.g. read and/or write requests) to data 28 stored on a storage medium (e.g. disk storage). Deduplication logic 22 module deduplicates data 28 that is accessed by data source 20. A goal of deduplication logic 22 is to maintain only a single copy of each unique set of data within data set 28. To achieve that goal, deduplication logic 22 finds data blocks that have not been deduplicated and processes data blocks for deduplication and encryption by computing digests for data blocks. A digest 21 is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table 26 in order to process data blocks within data set 28 for encryption and deduplication. Further, a deduplication key identifying a data block is also stored in index table 26 along with the digest for the data block. A deduplication key 27 uniquely identifies a data block by storing information (such as logical address, physical address) of the data block. Deduplication logic 22 identifies data blocks that can potentially be deduplicated by comparing digests of data blocks with list of digests stored in index table 26. The digest of the data block is then used to derive an encryption key and the encryption key is then used to encrypt the data block. Encryption logic 24 module may use any one of number of the well-known and publicly available key encryption algorithms to encrypt the data using the encryption key.

Figure 3A:
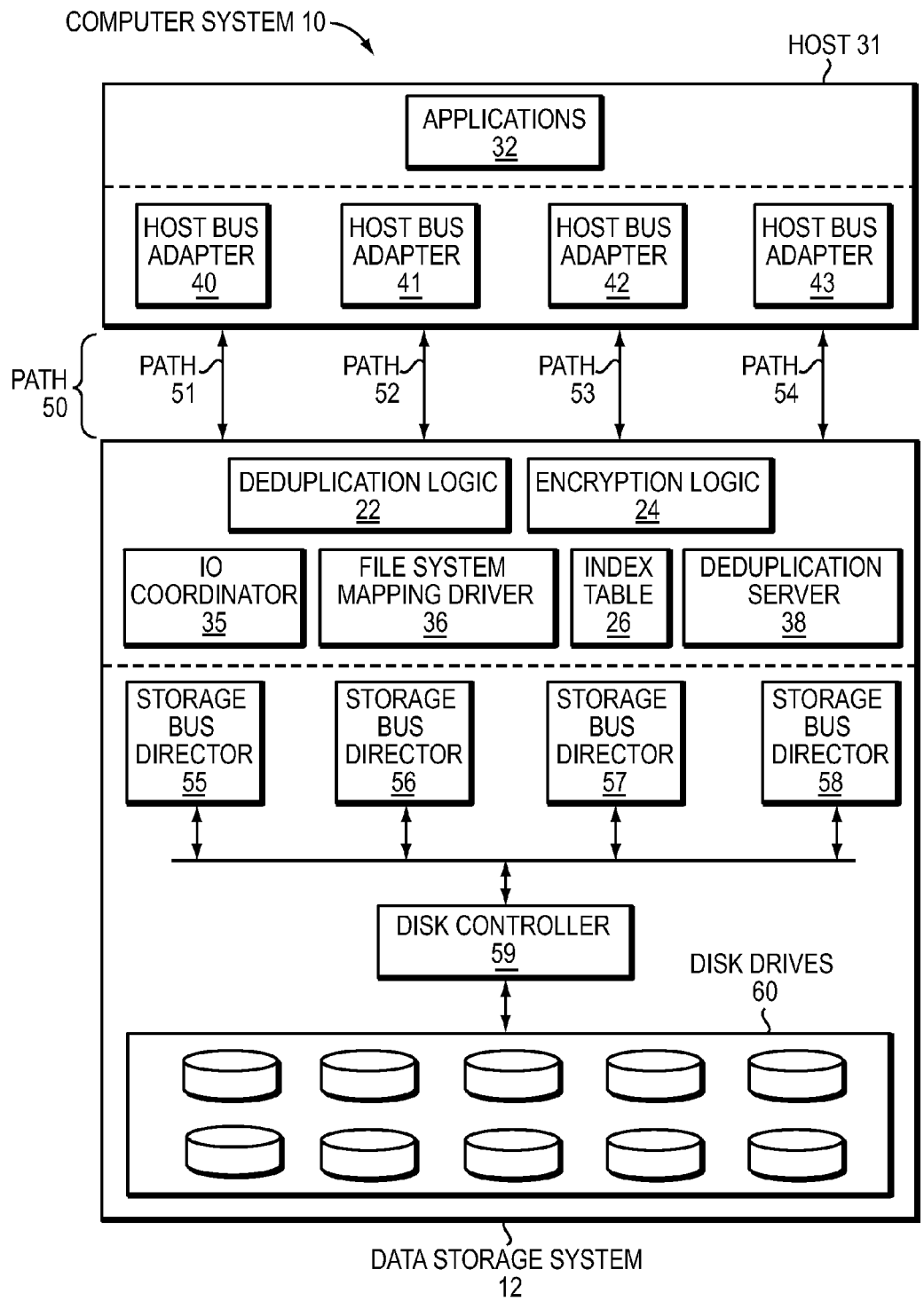
FIGS. 3A and 3B are examples of an embodiment of a computer system that may utilize the techniques described herein.
Figure 3B:
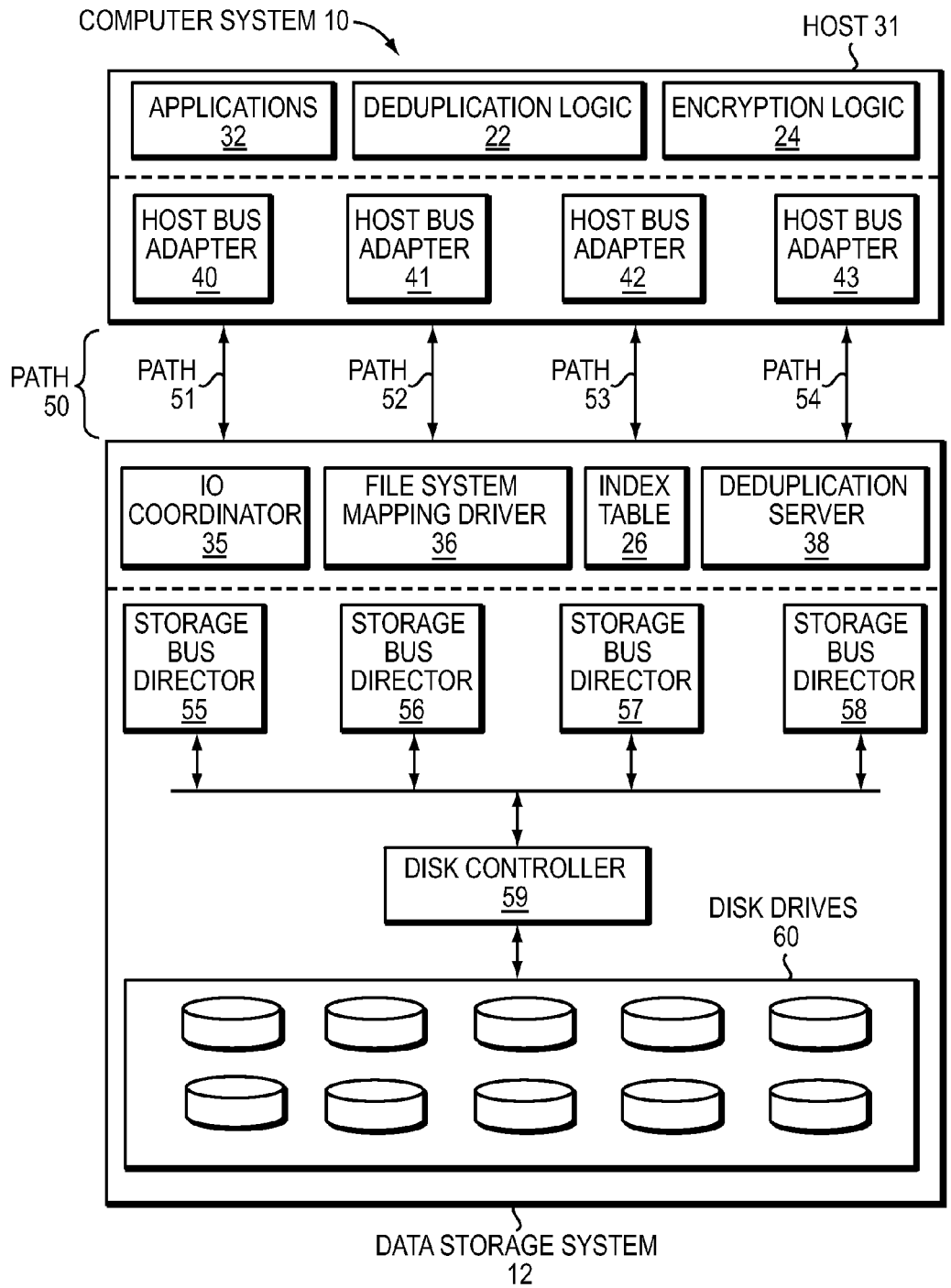

Referring to FIG. 3A and FIG. 3B, shown is a more detailed example of an embodiment of a computer system that may be used in connection with performing the techniques described herein. A computer system 10 may include multiple hosts and multiple data storage systems in such a way that each host may access data on each of data storage systems. For simplicity, however, FIG. 3A and FIG. 3B illustrate a computer system 10 that includes a single host 31 and a single data storage system 12. Applications 32 running on an operating system of host 31 may access data in data storage system 12 via I/O driver and host bus adapters 40, 41, 42, and 43. Host 31 can be, for example, a server, a personal computer, or any other device capable of initiating read and write requests to data storage system 12. Host 31 has multiple paths 50 for sending I/O requests to data storage system 12. Typically, there are at least two paths from a host to a data storage system. FIGS. 3A and 3B show four paths from host 31 to data storage system 12: path 51, path 52, path 53, and path 54. Each of the paths 50 can be any of a number of different types of communication links that allow data to be passed between data storage system 12 and host 31. Each of the host bus adapters 40, 41, 42, and 43 would be adapted to communicate using an appropriate protocol via the paths 50 with the storage bus directors 55, 56, 57 and 58. For example, path 50 can be implemented as a SCSI bus with host bus adapters 40 and storage bus director 55 each being a SCSI driver. Alternatively, path 50 between the host 31 and the data storage subsystem 12 may be a Fibre Channel fabric. Moreover, a path 50 may include multiple communication path types and may be part of a communication network. Storage bus directors 55, 56, 57 and 58 further communicates with the disk controller 59 to access data stored on the disk drives 60. The disk controller 59 may be configured to perform data storage operations on behalf of the host 31.

In at least one embodiment of the current technique, deduplication logic 22 and encryption logic 24 can be provided on data storage system 12 as shown in FIG. 3A. In an alternative embodiment, deduplication logic 22 and encryption logic 24 may be provided also or instead on a host system, such as host system 31 as shown in FIG. 3B. As described elsewhere herein, encryption logic 24 may be performed in a manner that is transparent to an application running on a host system. In at least one embodiment of the current technique, deduplication server 38 provides deduplication services in data storage system 12 by working in conjunction with IO Coordinator 35 and File System Mapping Driver 36. IO Coordinator 35 manages I/O operations in conjunction with the file system mapping driver 36. IO Coordinator 35 provides framework for implementing digest and other I/O requests issued by the deduplication server 38. File system mapping driver 36 is a light-weight file system library that provides a file system functionality and allows data storage system 12 to create files within a file system. File system mapping driver 36 processes I/Os directed to metadata of a file system and provides information regarding metadata (e.g., deduplication key) of a data block that is potentially a candidate for deduplication and encryption.

Figure 4:
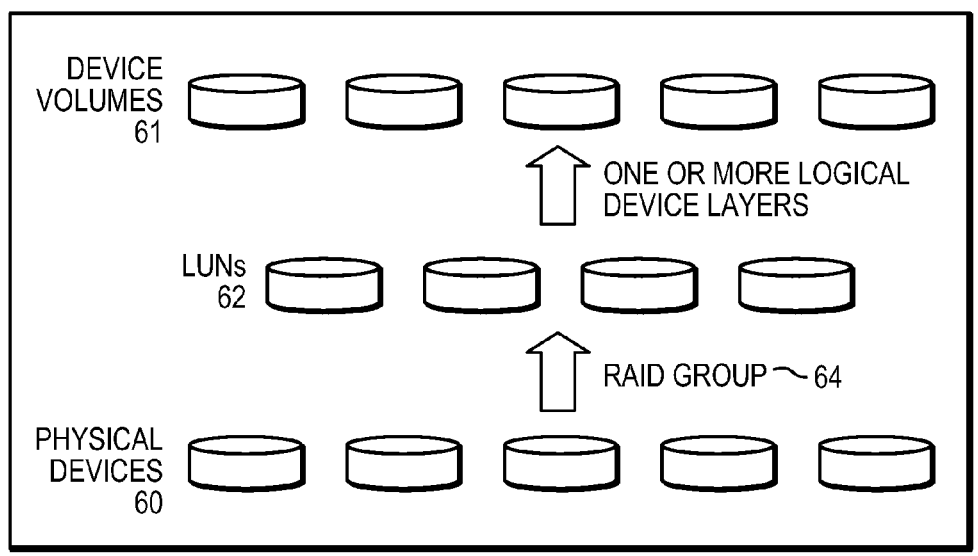
FIG. 4 is an example illustrating storage device layout.

FIG. 4 illustrates one of the many ways of constructing storage extents from a group of physical devices. For example, RAID Group 64 may be formed from physical disk devices 60 (such as disk drives). The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consisting of a set of storage extents includes a set of deduplicated LUNs sharing a common set of blocks.

Figure 5:
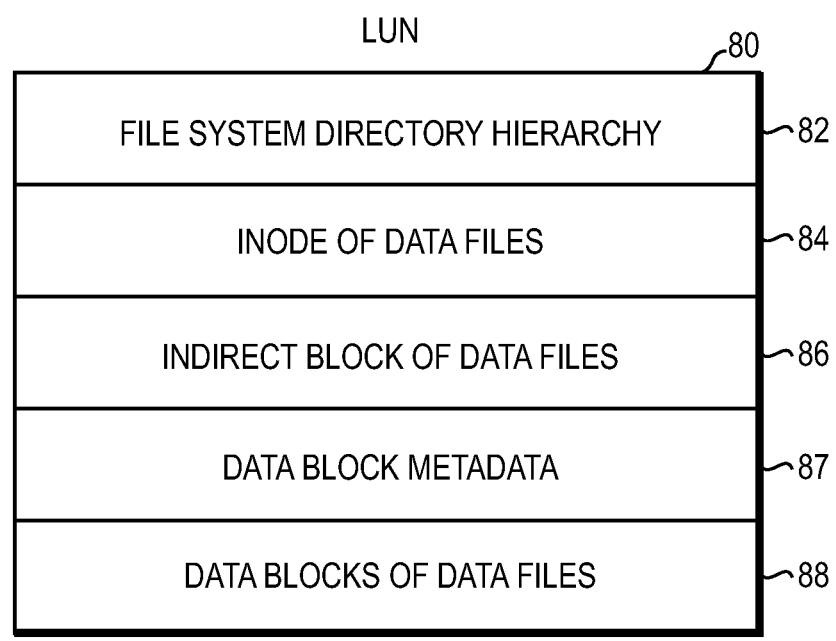

Referring to FIG. 5, shown is a logical representation of a LUN presented as a file system to a host system that may be included in an embodiment using the techniques herein. A user of data storage system 12 access data from LUNs stored on disk drives 60 in fixed sized chunks. Each fixed size chunk is known as a slice. One or more slices are grouped together to create a slice pool. Host system 31 provisions storage from slice pools for creating LUNs. A LUN 80 is visible to host system 31 and a user of a data storage system 12. Typically, storage is allocated when host system 31 issues a write request and needs a data block to write user's data. File systems typically include metadata describing attributes of a file system and data from a user of the file system. A file system contains a range of file system blocks that store metadata and data. File system mapping driver 36 allocates file system blocks from slices of storage for creating files and storing metadata of a file system. In at least some embodiments of the current technique, the file system block may be 8 kilobyte (KB) in size. Further, a user of data storage system 12 creates files in a file system. The file system is organized as a hierarchy. At the top of the hierarchy is a hierarchy of the directories 82 in the file system. Inodes of data files 84 depend from the file system directory hierarchy 82. Indirect blocks of data files 86 depend from the inodes of the data files 84. Data block metadata 87 and data blocks of data files 88 depend from the inodes of data files 84 and from the indirect blocks of data files 86.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks.

Figure 6:
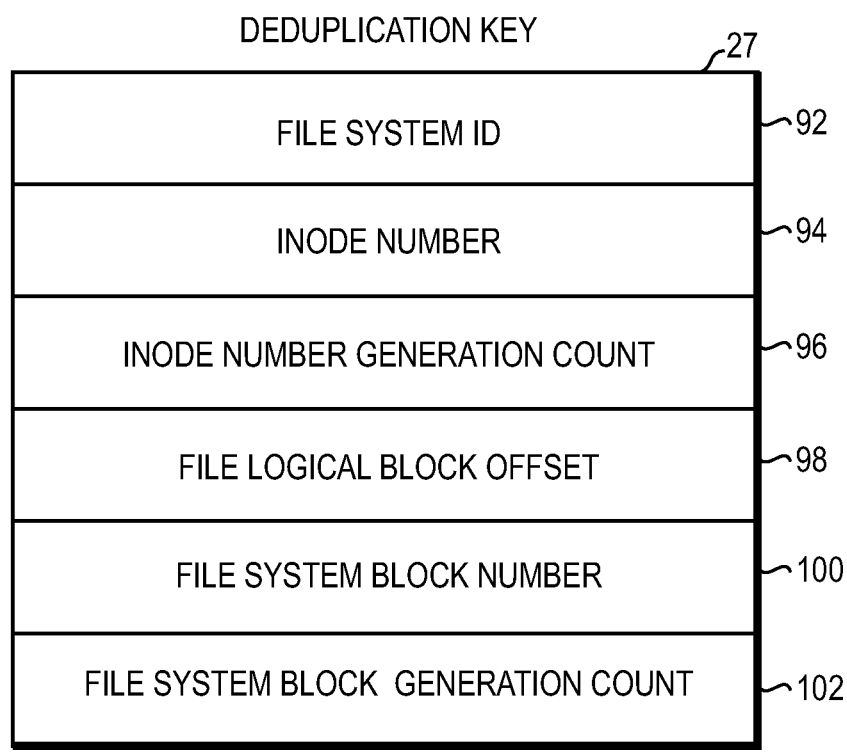

Referring to FIG. 6, shown is a representation of a deduplication key identifying a data block that may be included in an embodiment using the techniques herein. A deduplication key 27 is used by deduplication logic 22 to map a digest entry with a data block. The deduplication key allows deduplication logic 22 to find data blocks in a filesystem that contain identical contents. Thus, a deduplication key (also referred to simply as "key") must contain a sufficient description of a data block in order to find a matching data block in the file system. Deduplication key 27 includes file system ID 92, inode number 94, inode number generation count 96, file logical block offset 98, file system block number 100 and file system block generation count 102. File system ID 92 identifies a file system by a unique number. Inode number 94 identifies an inode of a file stored within the file system. Inode number generation count 96 identifies an inode number that is re-used to identify a second file when a file previously associated with the inode number is deleted. File logical block offset 98 indicates an offset at which a file system block representing a data block resides within a logical address space of the file system. File system block number 100 indicates a unique number identifying the file system block. File system block generation count 102 is incremented each time a deduplicated data block is modified by a write operation from a host system. Additionally, deduplication keys are computed by file system mapping driver 36. Deduplication logic 22 uses these deduplication keys for encryption and deduplication of data blocks in deduplication systems.

Referring to FIG. 7, shown is a representation of a index table that may be included in an embodiment using the techniques herein. Deduplication logic 22 maintains an index table 26 to store list of digests and deduplication keys for encrypted deduplicated data blocks in data storage system 12. In at least some implementations, an index table is a persistent hash-table of chunk-IDs keyed either by the digest of the data stored in the chunk or by the deduplication key of the data stored in the chunk. The index table need not contain entries for every data chunk in the deduplication domain, but the effectiveness of deduplication is a function of the number of entries stored in the index table 26. The more entries in the index table, the more likely that duplicate blocks will be detected during an iteration of data blocks. To accommodate more entries, the index table requires more memory and storage resources. Additionally, if the amount of storage used by the user is in terabytes, it can take days to iterate over the chunks of data for such a large address space of the storage. Thus, the index table typically contains an incomplete set of entries and does not include digests for all of the data inside all of the storage in the deduplication domain. Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 26) that maintains a digest 21 (e.g., SHA, checksum), a deduplication key 27 and a generation count 110 for each data block. When two data blocks have the same digest and the same deduplication key they have a sufficiently high probability of containing the same data to warrant a bit-for-bit comparison to confirm they are exact duplicates. Remapping leverages dynamic block-mapping technology of filesystem mapping driver 36. A filesystem allows dynamic manipulation of the address maps that connects LUN's logical address space to its physical address space. Generation count 110 indicates that a data block may have the same digest as another data block in the index table but different deduplication key. For example in FIG. 7, first index entry 116 in index table 26 stores the digest and the deduplication key for the data block DB-0. Second index entry 118 in index table 26 stores the digest and the deduplication key for the data block DB-1. Third index entry 120 in index table 26 stores the digest and the deduplication key for the data block DB-4. As shown in FIG. 7, the digest of the data block DB-4 is identical to the digest of the data block DB-1 but the deduplication key for the data block DB-4 is different from the deduplication key for the data block DB-1 indicating that data blocks DB-4 and DB-1 may not contain identical data and thus, two data blocks DB-4 and DB-1 can not be deduplicated and encrypted using the same encryption key. As a result, the generation count for the data block DB-4 is incremented to indicate that even though the digest of the data block DB-4 matches with the digest of another data block, the data block DB-4 can not be deduplicated with the data block DB-1. Similarly, fourth index entry 122 in index table 26 stores the digest and the deduplication key for the data block DB-2 and nth index 124 in index table 26 stores the digest and the deduplication key for nth data block.

Figure 8:
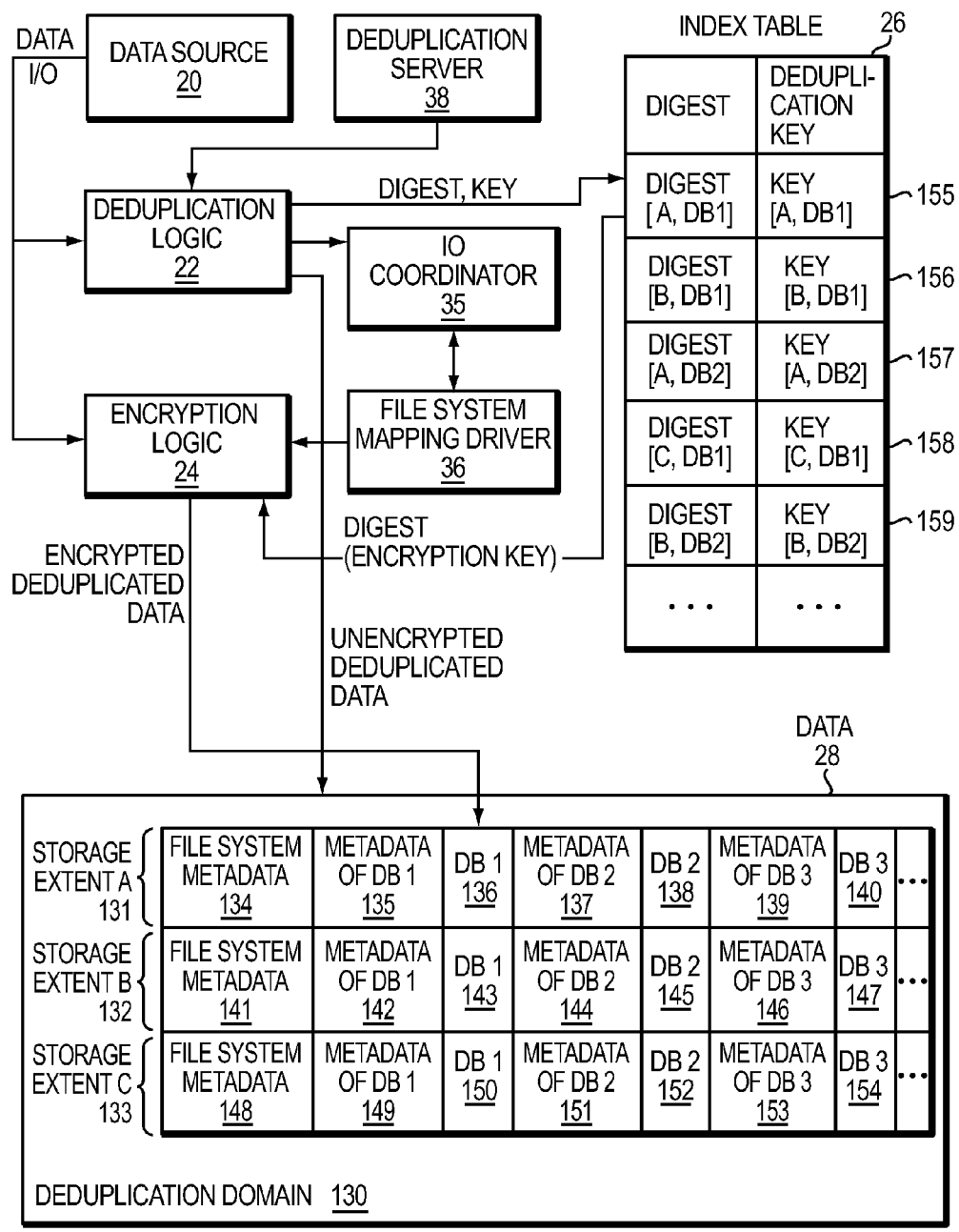

Referring to FIG. 8, shown is a more detailed representation of components that may be included in an embodiment using the techniques herein. In a deduplication domain, each storage extent contains a range of data blocks. For example, in FIG. 8, storage extent A 131, storage extent B 132 and storage extent C 133 are part of the deduplication domain 130. Within a data storage system 12, there may be multiple deduplication domains stored in data set 28. Further, data set 28 resides on disk drives 60 and is organized as file systems. File systems are presented to a host system as LUNs. Within a deduplication domain, a goal of a deduplication process is to maintain only a single copy of each unique set of data. Software or other logic (e.g. deduplication logic 22) executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block of a file in a filesystem. For example, in FIG. 8, storage extent A 131 includes data blocks 136, 138 and 140, storage extent B 132 includes data blocks 143, 145 and 147 and storage extent C 131 includes data blocks 150, 152, 154 and other data blocks (not shown). A storage extent also includes a metadata of a filesystem stored in that storage extent and a metadata for each of the data block of data files stored in the filesystem. For example, in FIG. 8, storage extent A 131 includes file system metadata 134 and metadata 135, 137, 139 for data blocks DB-1 136, DB-2 138 and DB-3 140 respectively, storage extent B 132 includes file system metadata 141 and metadata 142, 144, 146 for data blocks DB-1 143, DB-2 145 and DB-3 147 respectively and storage extent C 131 includes file system metadata 148 and metadata 149, 151, 153 of data blocks DB-1 150, DB-2 152 and DB-3 154 respectively.

In at least one embodiment of the current technique, deduplication server 38 is a component that provides services to deduplication logic 22 to iterate over sets of data in a deduplication domain 130. Deduplication logic 22 computes digests and remaps blocks after a deduplication technique is applied to remove duplicate blocks of data. A digest is created for each chunk of data that is iterated. Deduplication logic 22 detects potential duplicate copies of data during an iteration of data blocks and issues a request to the deduplication server 38 to deduplicate the data. In at least one embodiment, use of the current technique enables encryption of data blocks that are being deduplicated by deduplication logic 22 such that information used to deduplicate the data block is also used to encrypt the data block. Deduplication logic 22 works in conjunction with encryption logic 24 to encrypt a data block at the same time the data block is being processed for deduplication. Index table 26 stores list of digests and deduplication keys for encrypting and deduplicating data blocks. For example, in FIG. 8, index entry 155 of index table 26 includes the digest and the deduplication key for the data block DB-1 136 of storage extent A 131, index entry 156 of index table 26 includes the digest and the deduplication key for the data block DB-1 143 of storage extent B 132, index entry 157 of index table 26 includes the digest and the deduplication key for the data block DB-2 138 of storage extent A 131, index entry 158 of index table 26 includes the digest and the deduplication key for the data block DB-1 150 of storage extent C 133, index entry 159 of index table 26 includes the digest and the deduplication key for the data block DB-2 145 of storage extent B 132, and so on.

In at least one embodiment of the current technique, deduplication logic 22 iterates over a set of data blocks for encrypting and deduplicating the set of data blocks. In another embodiment of the current technique, deduplication logic receives an I/O request directed to a data block from data source 20 and processes the data block for encryption and deduplication. Deduplication logic 22 computes a digest of the data block and retrieves a deduplication key for the data block from file system mapping driver 36. Deduplication logic 22 then compares the digest of the data block with the list of digests stored in index table 26 to find an index entry in the index table 26 that contains a matching digest and a matching deduplication key. If a matching index entry is found, deduplication logic 22 issues a request to the deduplication server 38 to deduplicate the data. Deduplication logic 22 works in conjunction with IO Coordinator 35 and file system mapping driver 36 to deduplicate data blocks. File system mapping driver 36 provides the deduplication key for the deduplicated data block to encryption logic 24 for encrypting the deduplicated data block. Encryption logic 24 derives an encryption key from the digest of the data block and encrypts the data block. If no matching index entry is found, deduplication logic 22 stores the digest of the data block in index table 26.

It should be noted that deduplication logic 22 and encryption logic 24 may also be included as part of deduplication server 38. Further, it should be noted that deduplication logic 22 and encryption logic 24 may also be included as part of any other component in an embodiment. Additionally, it should be noted that the index table can be encrypted as well to provide enhanced security protection against loss or theft of data. Further, it should be noted that a deduplication key may also be stored in a metadata of a file system.

Figure 9:
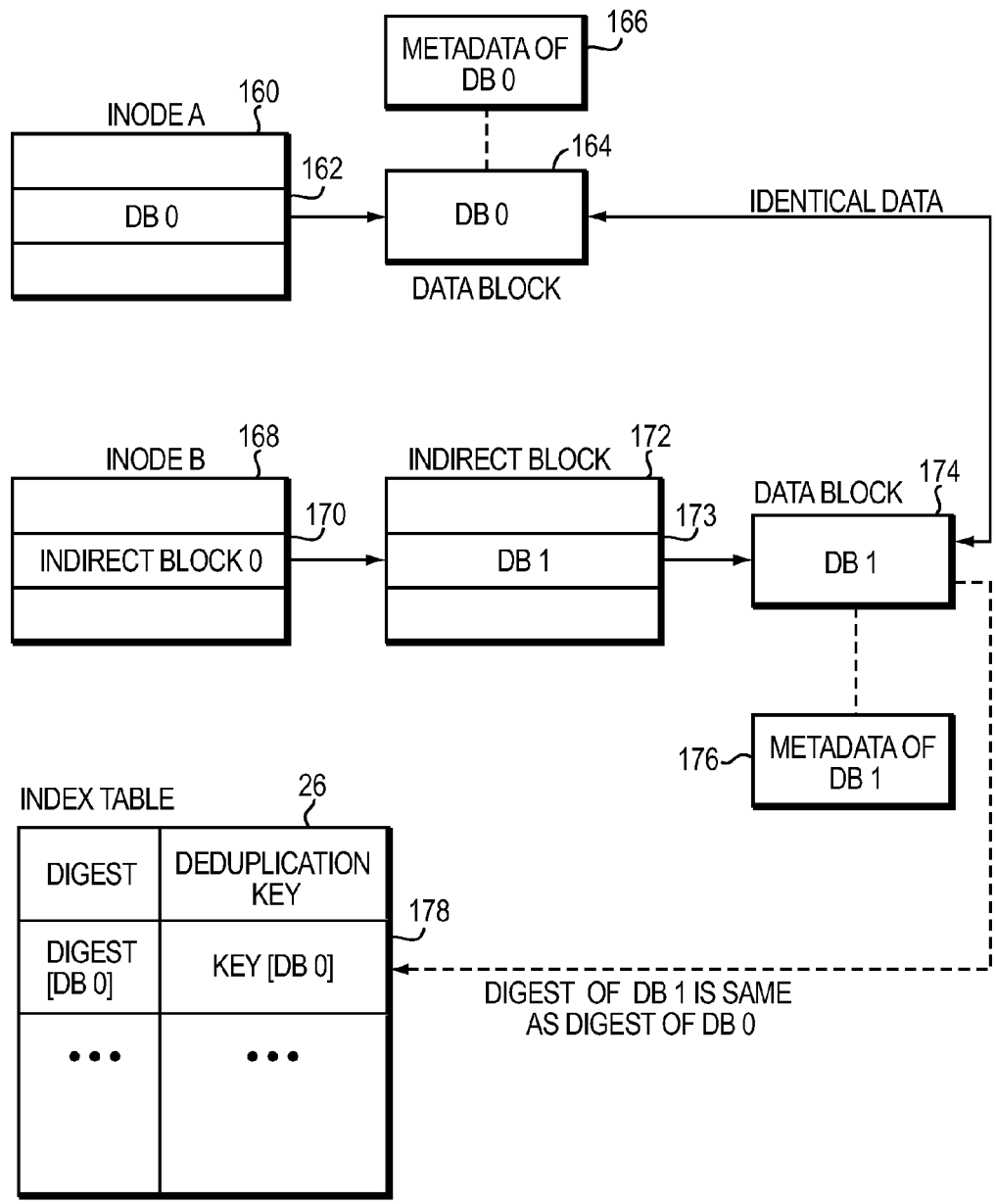
FIGS. 9 and 10 are block diagrams illustrating in more detail components that may be used in connection with techniques herein.

Referring to FIG. 9, shown is a mapping of data blocks of a file system before deduplication of data blocks that may be included in an embodiment using the techniques herein. Inode A 160 represents metadata of a first file in a file system. Inode B 168 represents metadata of a second file in the file system. Inode A 160 includes a pointer 162 to data block DB-0 164 of the first file. Inode B 168 includes an indirect block pointer 170 pointing to indirect block 172 that includes a pointer 173 to data block DB-1 174. Metadata 166 stores data (such as deduplication key, block number, offset) about data block DB-0 164. Similarly, metadata 176 stores data about data block DB-1 174. Index table 26 includes an entry 178 for data block DB-0 164 that contains the digest and the deduplication key for the data block DB-0 164. With reference also to FIG. 8, when data source sends an I/O request for the data block DB-1, digest is computed for the data block DB-1 or when the data block DB-1 is part of an iteration scheme, deduplication logic 22 computes a digest for the data block DB-1. Deduplication logic 22 then compares the digest of the data block DB-1 with list of digests stored in index table 26 and finds an index entry 178 that contains a matching digest entry. Deduplication logic 22 determines that the digest of the data block DB-1 is identical to the digest of the data block DB-0. If the matching digest entry is found, the data block DB-0 and the data block DB-1 can then be deduplicated.

Figure 10:
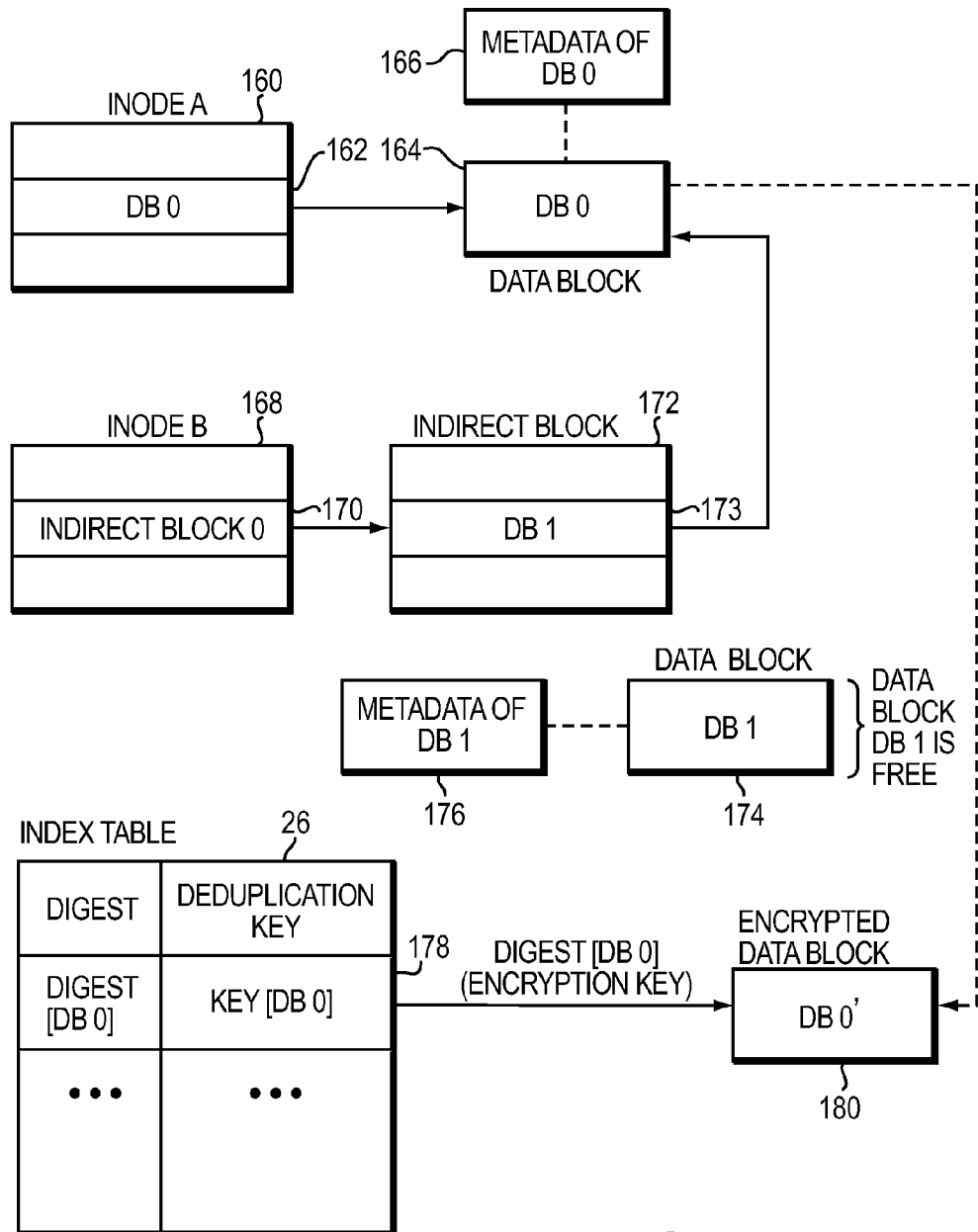

Referring to FIG. 10, shown is a mapping of data blocks of a file system after deduplication of data blocks that may be included in an embodiment using the techniques herein. With reference also to FIG. 8 and FIG. 9, if the matching digest entry is found in the index table 26 for the data block DB-1 174, the block mapping of the data block DB-1 174 is updated in order to deduplicate the data block DB-1 174. Indirect block pointer 173 is updated to point to the data block DB-0 164 instead of the data block DB-1 174. The data block DB-1 is then freed up as an unused space. Encryption logic 24 derives an encryption key for the data block DB-0 164 from the digest 178 for the data block DB-0 164 and encrypts the data block DB-0 164 into encrypted deduplicated data block DB-0' 180. Further, metadata 166 of data block DB-0 164 is updated to indicate that the data block is encrypted.

Figure 11:
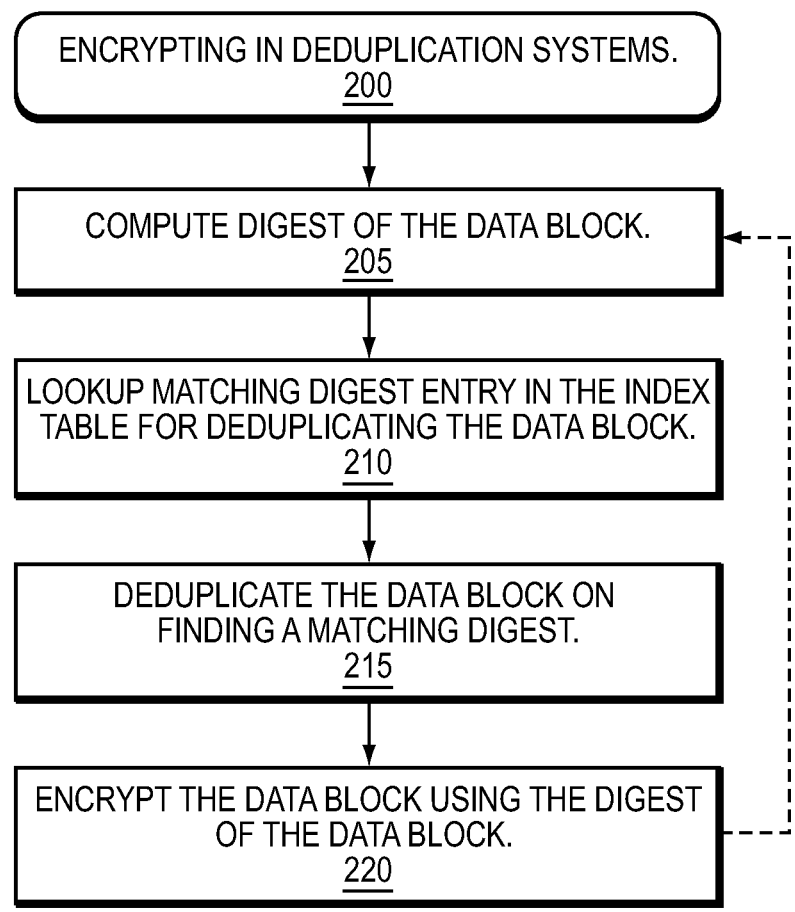
FIGS. 11-13 are flow diagrams illustrating processes that may be used in connection with techniques herein.

Referring to FIG. 11, shown is a flow diagram illustrating a flow of data in the data storage system. With reference also to FIG. 8, encryption in deduplication systems is performed either when deduplication server 38 iterates through a set of data blocks in a deduplication domain or when data source 20 sends an I/O request to a data block (step 200). A digest for the data block is computed (step 205). In order to deduplicate the data block, index table 26 is searched to find a matching index entry that includes a digest and a deduplication key identical to the digest for the data block (step 210). If the matching digest entry is found in the index table 26, the data block is deduplicated (step 215). The data block is then encrypted using an encryption key derived from the digest of the data block (step 220).

Figure 12:
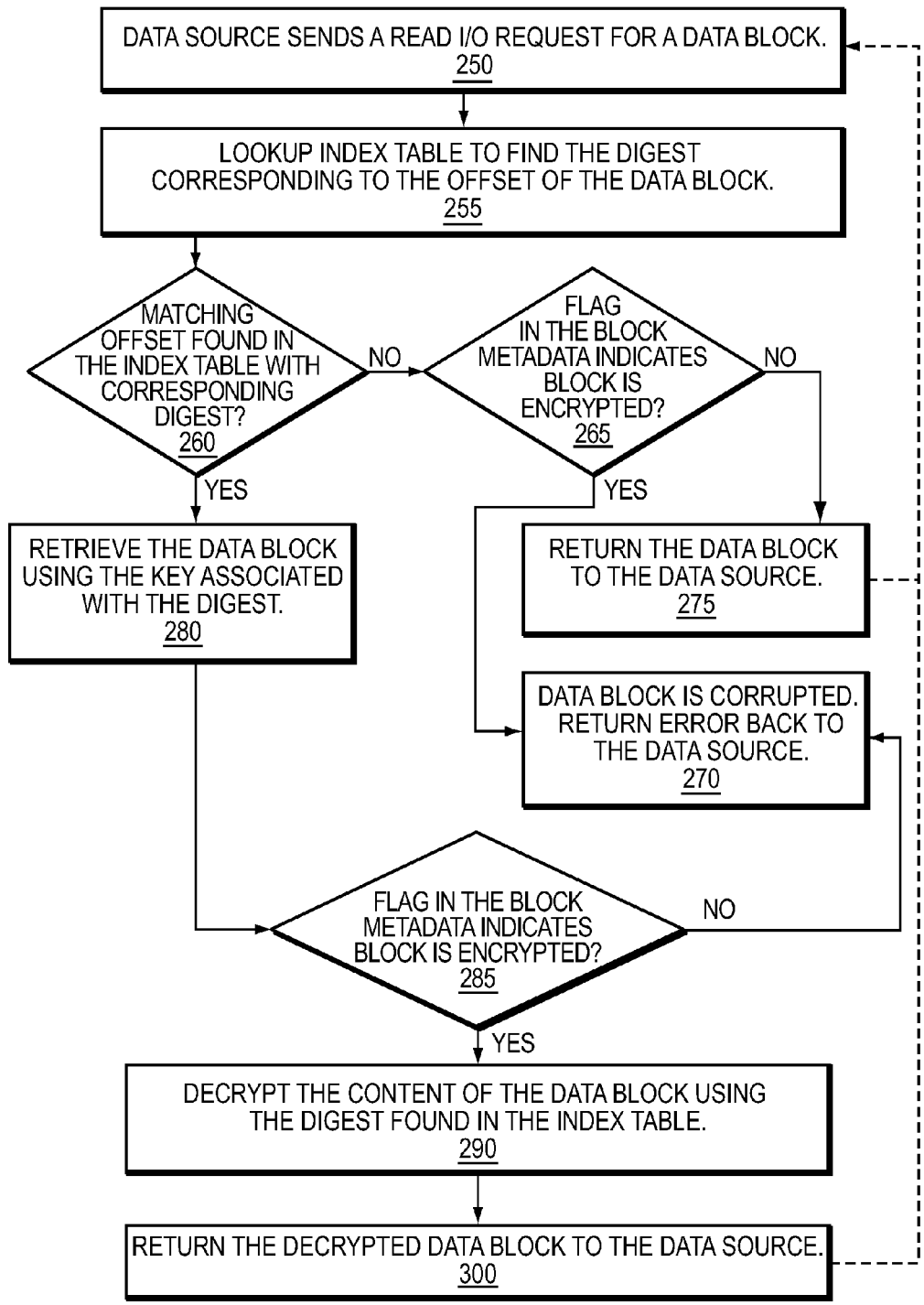

Referring to FIG. 12, shown is a more detailed flow diagram illustrating a flow of data in the data storage system. With reference also to FIG. 8, data source 20 sends a read I/O request for a data block where the read request of the data block includes an offset of the data block (step 250). Deduplication logic 22 searches index table 26 to find an index entry containing a digest corresponding to the data block. Deduplication keys stored in the index table 26 includes offset of a data block that indicates the physical location of the data block within the filesystem. Thus, list of deduplication keys in index table 26 can be compared with the offset of the data block to find a matching index entry that includes an offset exactly similar to the offset of the data block (step 255). If the matching index entry including the offset of the data block is found in the index table 26 (step 260), the data block is retrieved from the disk storage using the deduplication key associated with the matching index entry (step 280). A flag in the metadata of the data block is checked to determine whether the flag indicates that the data block is encrypted (step 285). If the flag indicates that the data block is not encrypted, it indicates that the data block may be corrupted and hence an appropriate error is returned back to the data source 20 (step 270). If the flag indicates that the data block is encrypted, contents of the data block are decrypted using the digest of the data block as a decryption key (step 290). The decrypted data block is then returned to data source 20 (step 300). If no matching index entry containing the offset of the data block is found in the index table, the flag in the metadata of the data block is checked to determine whether the flag indicates that the data block is encrypted (step 265). If the flag indicates that the data block is encrypted, it indicates that the data block may be corrupted and hence an appropriate error is returned back to the data source 20 (step 270).

Figure 13:
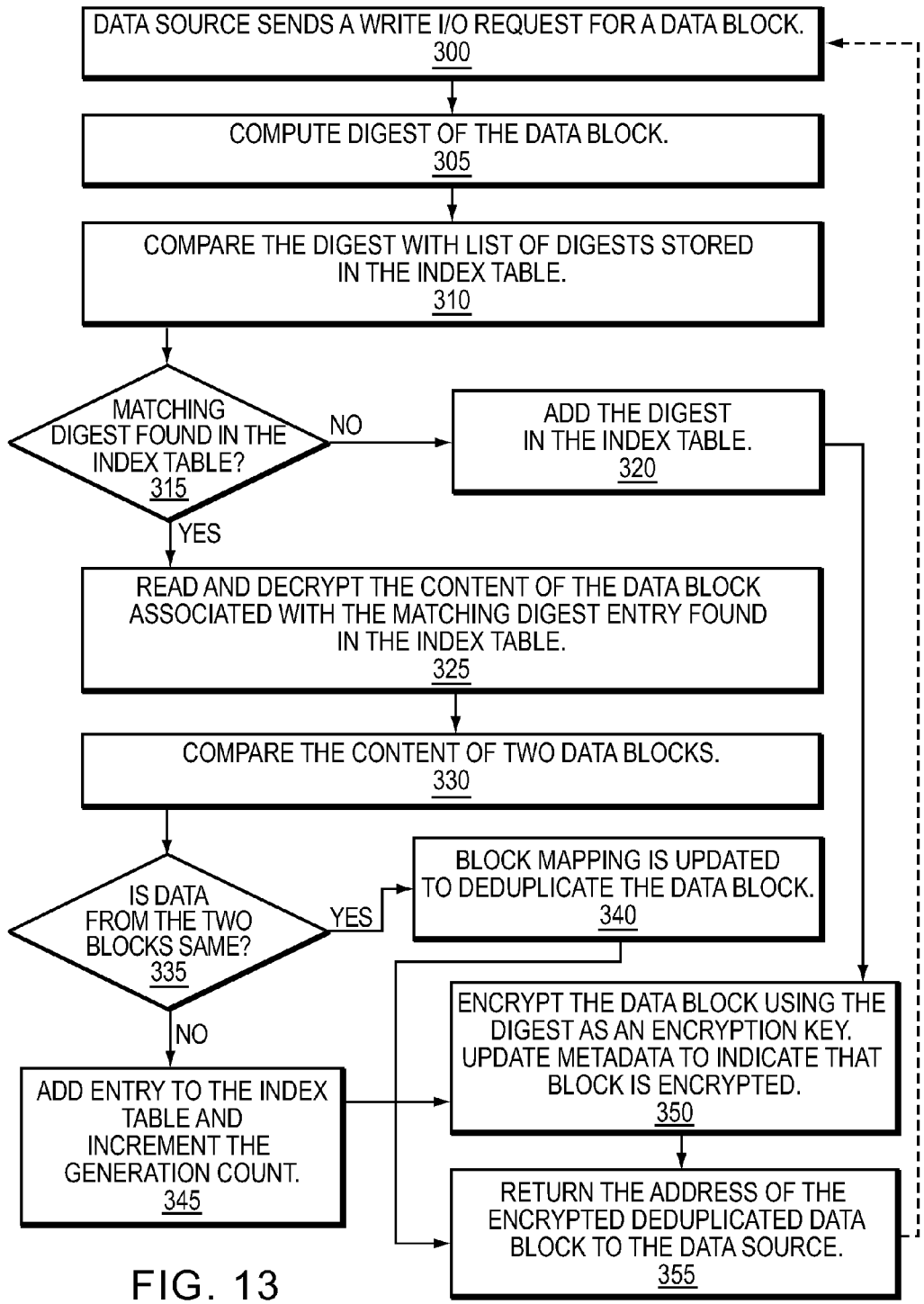

Referring now to FIG. 13 that illustrates a process of encrypting and deduplicating two data blocks that have been identified by deduplication logic 22 as duplicate data blocks during processing of a digest information. With reference also to FIG. 8, data source 20 sends a write I/O request for a data block (step 300). Deduplication logic 22 computes a digest of the data block (referred below as "first data block") (step 305). Deduplication logic 22 then compares the digest information of the first data block with the list of digests stored in the index table 26 (step 310). A matching digest found in the index table indicates that the first data block contains exact same data as data stored in a second data block corresponding to the matching digest (step 315). Deduplication logic 22 issues a request to the deduplication server 38 to deduplicate the first data block and the second data block. Deduplication server 38 extracts filesystem information for the first data block from file system mapping driver 36 and extracts filesystem information for the second data block from the deduplication key associated with the matching digest found in the index table. Deduplication server 38 issues an I/O request to the IO Coordinator 35. The IO Coordinator 35 issues a mapping request to the file system mapping driver 36 to find a physical address of the first data block. If the mapping request completes successfully, the IO Coordinator 35 reads the data from the first data block located at the physical address indicated by the mapping. The deduplication server 38 issues a read request for the second data block. The read request for the second data block is processed identically to the first read request. When the second read request completes, the second data block is decrypted by using the digest of the second data block as a decryption key (step 325). Deduplication server 38 compares the data read from the first data block with the data read from the second data block (step 330). If the data of the first data block is not same as the data of the second data block, an entry is added to the index table and a generation count for the data block included in the index table is incremented (step 345). The data block is then encrypted using the digest of the data block as an encryption key and metadata of the data block is updated to indicate that the data block is encrypted (step 350). If the data of the first data block is same as the data of the second data block, the IO Coordinator 35 requests deduplication server 38 to deduplicate the two identical data blocks by updating address mapping of data blocks (step 340). If the data blocks are successfully deduplicated, the address mapping of the first data block is updated to point to a single copy of the data (i.e., the address map of the first data block now points to the address map of the second data block). The address of the encrypted deduplicated data block is returned to data source 20 (step 355). If no matching digest is found in the index table (step 315), the digest for the data block is added to the index table (step 320). The data block is then encrypted using the digest of the data block as an encryption key and metadata of the data block is updated to indicate that the data block is encrypted (step 350). The address of the encrypted deduplicated data block is returned to data source 20 (step 355).

It should be noted that various embodiments of the current technique can derive an encryption key for a data block in various ways. The encryption key can be derived from a digest of a data block or from a portion of the digest of the data block. The encryption key can also be a digest of a data block or a portion of the digest of the data block. In another embodiment, the encryption key can be an index of a data block, where the index is used to uniquely identify the data block for deduplication.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in encrypting in deduplication systems, the method comprising:
applying a deduplicating technique to a data block, wherein applying the deduplicating technique comprises computing a digest of the data block and retrieving a deduplication key for the data block from metadata of the data block, wherein applying the deduplicating technique includes iterating over a set of data blocks, determining another data block from the set of data blocks identical to the data block by comparing the digest and deduplication key of the data block with digests and deduplication keys stored in an index table, and based on the determination, mapping the data block to the another data block, wherein the deduplication key is associated with the digest of the data block, wherein the deduplication key and the digest is stored in the index table, wherein the deduplication key is used for deduplicating and encrypting the data block, wherein the deduplication key for the data block includes an offset for the data block, a data block number, and a generation count, wherein the generation count for the data block is updated each time the data block is updated by a write operation, wherein the metadata of the data block includes a flag indicating whether the data block has been encrypted;
using the digest of the data block as an encryption key for the data block; and
encrypting the data block using the encryption key.

2. The method of claim 1, wherein an index table comprises a set of index entries, wherein each index entry of the set of index entries is associated with a digest of a data block, a deduplication key of a data block and a generation count of a data block.

3. The method of claim 2, where the deduplication key comprises a file system ID, an inode number, a generation count, a file logical block offset, a file system block number and a file system generation count.

4. The method of claim 1, wherein the data block is selected from the group consisting of a deduplication domain, a storage extent, a LUN, a file and a data block, wherein the data block is a fixed size chunk of a physical disk storage.

5. The method of claim 4, wherein the deduplication domain comprises a set of storage extents, wherein each storage extent of the set of storage extents comprises a set of LUNs, each LUN of the set of LUNs is a logical representation of a subset of a physical disk storage.

6. The method of claim 1, wherein a digest is associated with a data block, wherein the digest is based on contents of the data block and uniquely identifies the data block.

7. The method of claim 1, wherein applying a deduplicating technique further comprising:
computing a digest for a data block; and
processing the digest for the data block.

8. The method of claim 7, wherein the processing of digest for the data block further comprising:
comparing the digest with one or more index entries of the index table;
determining, based on whether the digest matches with an index entry of the index table, whether to apply a deduplicating technique to the data block;
based on the determination, decrypting contents of a data block associated with the matching index entry;
comparing contents of the data block associated with the digest with unencrypted contents of the data block associated with the matching index entry; and
based on the comparison, applying a deduplicating technique to the data block associated with the digest and the data block associated with the matching index entry.

9. The method of claim 8, further comprising:
based on whether the digest matches with an index entry of the index table, adding an index entry to the index table, wherein the index entry is associated with the digest.

10. The method of claim 1, wherein applying the deduplicating technique further comprising:
updating an address mapping of a first data block to point to a second data block, wherein the first data block and the second data block contain same content of data, wherein the address mapping indicates a location of a data block on a disk storage; and
deleting the content of the first data block from the disk storage.

11. The method of claim 1, further comprising:
upon receiving a request to read data from a data block, comparing an offset of the data block with one or more index entries of an index table;
based on whether the offset matches with an index entry of the index table, retrieving the data block using a deduplication key associated with the matching index entry; and
decrypting the data block using an encryption key derived from a digest associated with the matching index entry.

12. The method of claim 1, further comprising:
upon receiving a request to write data to a data block, computing a digest for the data block;
based on whether the digest matches with an index entry of the index table, decrypting contents of a data block associated with the matching index entry;
comparing contents of the data block associated with the digest with unencrypted contents of the data block associated with the matching index entry;
based on the comparison, applying a deduplicating technique to the data block associated with the digest and the data block associated with the matching index entry; and
based on the application of the deduplicating technique, encrypting contents of the data block using an encryption key derived from the digest of the data block.

13. The method of claim 12, wherein metadata of the data block is updated indicating the data block is encrypted.

14. A system for use in encrypting in deduplication systems, the system comprising:
first logic applying a deduplicating technique to a data block, wherein applying the deduplicating technique comprises computing a digest of the data block and retrieving a deduplication key for the data block from metadata of the data block, wherein applying the deduplicating technique includes iterating over a set of data blocks, determining another data block from the set of data blocks identical to the data block by comparing the digest and deduplication key of the data block with digests and deduplication keys stored in an index table, and based on the determination, mapping the data block to the another data block, wherein the deduplication key is associated with the digest of the data block, wherein the deduplication key and the digest is stored in the index table, wherein the deduplication key is used for deduplicating and encrypting the data block, wherein the deduplication key for the data block includes an offset for the data block, a data block number, and a generation count, wherein the generation count for the data block is updated each time the data block is updated by a write operation, wherein the metadata of the data block includes a flag indicating whether the data block has been encrypted;
second logic using the digest of the data block as an encryption key for the data block; and
third logic encrypting the data block using the encryption key.

15. The system of claim 14, wherein an index table comprises a set of index entries, wherein each index entry of the set of index entries is associated with a digest of a data block, a deduplication key of a data block and a generation count of a data block.

16. The system of claim 14, further comprising:
fourth logic comparing, upon receiving a request to read data from a data block, an offset of the data block with one or more index entries of an index table;
fifth logic retrieving, based on whether the offset matches with an index entry of the index table, the data block using a deduplication key associated with the matching index entry; and sixth logic decrypting the data block using an encryption key derived from a digest associated with the matching index entry.

17. The system of claim 14, further comprising:

fourth logic computing, upon receiving a request to write data to a data block, a digest for the data block;

fifth logic decrypting, based on whether the digest matches with an index entry of the index table, contents of a data block associated with the matching index entry;

sixth logic comparing contents of the data block associated with the digest with unencrypted contents of the data block associated with the matching index entry;

seventh logic applying, based on the comparison, a deduplicating technique to the data block associated with the digest and the data block associated with the matching index entry; and eighth logic encrypting, based on the application of the deduplicating technique, contents of the data block using an encryption key derived from the digest of the data block.

* * * * *